Sept. 25, 1962  D. H. SHEPARD  3,056,033

DIFFERENTIAL SCANNING APPARATUS

Filed Aug. 4, 1958

7 Sheets-Sheet 1

INVENTOR
David H. Shepard

BY Mason, Fenwick & Lawrence
ATTORNEYS

INVENTOR
David H. Shepard

BY
Mason, Fenwick & Lawrence
ATTORNEYS

INVENTOR
David H. Shepard

BY Mason, Fenwick & Lawrence
ATTORNEYS

Sept. 25, 1962 D. H. SHEPARD 3,056,033

DIFFERENTIAL SCANNING APPARATUS

Filed Aug. 4, 1958 7 Sheets-Sheet 4

INVENTOR
David H. Shepard

BY Mason, Fenwick & Lawrence
ATTORNEYS

Sept. 25, 1962 D. H. SHEPARD 3,056,033

DIFFERENTIAL SCANNING APPARATUS

Filed Aug. 4, 1958

7 Sheets-Sheet 5

INVENTOR

David H. Shepard

BY Mason, Fenwick & Lawrence

ATTORNEYS

Sept. 25, 1962 D. H. SHEPARD 3,056,033

DIFFERENTIAL SCANNING APPARATUS

Filed Aug. 4, 1958 7 Sheets-Sheet 6

INVENTOR

David H. Shepard

BY Mason, Fenwick & Lawrence

ATTORNEYS

Sept. 25, 1962 D. H. SHEPARD 3,056,033

DIFFERENTIAL SCANNING APPARATUS

Filed Aug. 4, 1958

7 Sheets-Sheet 7

INVENTOR

David H. Shepard

BY

Mason, Fenwick & Lawrence

ATTORNEYS

United States Patent Office 3,056,033
Patented Sept. 25, 1962

3,056,033

DIFFERENTIAL SCANNING APPARATUS

David H. Shepard, Falls Church, Va., assignor to Intelligent Machines Research Corporation, Alexandria, Va., a corporation of Maryland Filed Aug. 4, 1958, Ser. No. 752,961
15 Claims. (Cl. 250—219)

My invention relates in general to methods and apparatus for separately scanning intelligence bearing documents according to two or more sensible properties and for combining the resulting scan signals so as to differentiate between indicia possessing these properties in different combinations, and more particularly to scanning devices for use in automatic high speed character sensing machines reading character bearing documents which have been obscured by interfering marks.

Automatic character sensing machines employing optical scanning means are achieving wide acceptance for the recognition of characters on business documents. My copending application entitled Apparatus for Reading, filed December 17, 1953, Serial No. 399,227, now Patent No. 2,897,481, discloses how information written in human language may be automatically read and converted to machine language. More specifically, that application discloses how signals caused by systematic scanning of a document may be processed by logical apparatus so as to derive therefrom the identity of the characters which were scanned even though the characters are imperfectly registered, imperfectly printed and partially degraded by interfering marks.

While it has been found possible to rely on logical apparatus alone in achieving a high degree of accuracy in the recognition of characters partially obscured by interfering marks, I have discovered that the logical apparatus can be greatly simplified by use of my present invention which eliminates signals resulting from scanning of interfering marks while preserving signals resulting from scanning of the characters to be read.

My invention is based on a priori knowledge of sensible attributes or characteristics by which interfering marks may be differentiated from the characters to be read. These differentiating characteristics may be deliberately added to the characters at the time of writing or printing or they may naturally result from the difference in origin between the characters and the interfering marks.

An example of the latter can be found in preprinted data such as account numbers, serial numbers, bank transit numbers and bank routing symbols printed on bank checks. Inks used in the printing of such checks frequently contain a varnish agent. This varnish imparts a gloss to the imprinted characters which, by means of my invention, may be used to differentiate the printed characters from overstamping from cancellation and endorsing stamps and other non-glossy interference.

A second type of normally occurring differentia may be observed in a large portion of the overstamping interference found on bank checks. In the normal processing of bank checks, endorsements are applied by each bank or banker handling each check. The accumulation of endorsing stamps tends to obscure all endorsements. To aid in routing checks which must go back through the chain of endorsing banks because of estoppel or overdraft, banks have widely used endorsing inks of various hues so that human clerks may sort out endorsements by means of colored filters. Since offset of endorsing stamp ink, arising from contact transfer of endorsing ink when wet from the back of one document to the face of the next document, is the biggest single source of interference on the face of bank checks, my invention may be used to differentiate characters printed in black from colored offset, colored overstamping and other colored interference.

Even more powerful separation between characters and interfering marks may be obtained by deliberately adding a differentiating quality to the ink used in writing, typing or printing the characters to be read. For example, it is possible to compound an ink by the admixture of fluorescent phosphors with conventional ink pigments. Depending on the phosphors used, it is possible to have characters formed from the ink appear black under normal illumination but emit light of a single color when illuminated by ultraviolet light. It is also possible by use of other phosphors to cause characters which appear black under normal illumination to emit light outside the visible spectrum. My invention may be used with any such inks and will successfully differentiate between the ink characters and the interference so long as the interference does not have properties identical with those of the ink characters.

An object of the present invention is the provision of a novel system for scanning intelligence bearing characters which may have interference markings associated therewith and producing output scan signals denoting properties of the characters freed of distortion by signals representative of the interference markings.

Another object of the present invention is the provision of a novel system for separately scanning intelligence bearing characters which may be associated with interference markings according to two or more sensible properties and combining the resulting scan signals so as to differentiate between the characters and the interference markings.

Another object of the present invention is the provision of a novel system for scanning document supported characters which have been obscured by interference marks in a manner to produce output scan signals denoting properties of the characters for use by automatic character sensing machines wherein scan signals resulting from scanning of the interference marks are eliminated from the output scan signals.

Another object of the present invention is the provision of a novel scanning system for scanning document supported characters and any associated interference marks and differentiating the characters from the interference marks by means of known sensible attributes to produce output scan signals resulting from the scanning in which signals representative of the interference marks are eliminated.

Another object of the present invention is the provision of a novel system for scanning characters on a character bearing document together with associated interference and providing signals resulting from scanning of the characters and associated interference in such a way as to cancel the signals resulting from the interference while preserving the signals resulting from the characters.

Other objects, advantages and capabilities of the present invention will become apparent as the detail description of the invention proceeds.

While my invention is suitable to be adapted to a variety of scanning schemes, it is particularly suited for use with automatic regulating apparatus such as is described in my copending joint application with Howard W. Silsby, III titled Apparatus for Regulating Output of Photosensitive Scanners, filed April 20, 1956, Serial No. 579,594, now Patent No. 2,943,208 and with scanners such as are described in my copending application entitled Scanning Apparatus filed July 29, 1957, Serial No. 674,937, now Patent No. 2,978,590, as a voluntary division of Serial No. 579,594.

In the preferred embodiments of my invention to be described, the documents to be read are pre-printed bank checks in which the printed numbers to be read have become overstamped by ink markings from cancellation and endorsing stamps. A suitable feed mechanism passes the checks sequentially before a reading station. At the reading station the documents are illuminated as needed to permit each of the differentiating qualities to be sensed. For example, if the checks have been printed with glossy characters, illumination will be arranged so as to maximize the glossy reflection while also providing light for normal dark and light sensing. If the colored hues of the overstamping are to be sensed, then an illumination is required which has an energy distribution spanning the portion of the visible spectrum occupied by the hues to be discriminated. Of course, if colored hues spanning the entire visible spectrum are to be sensed, an illumination source having a coextensive spectral energy distribution is required. When the characters have been printed with fluorescent inks, an illumination source capable of exciting the fluorescent phosphors into emission is used.

Scanners such as are described in my application Serial No. 674,937 are suitably modified to provide separate point scanning along a line at the reading station by two sensing means in such a manner that the differentiating qualities are sensed either separately or in different combinations. For example; the glossy reflection from the scanning point may be detected by one sensing element while the dark and light diffuse reflection from the same scanning point may be detected by a second sensing element. Alternatively, the red component of reflection from a scanning point may be sensed by one element while the blue component of reflected light is sensed by another. As a second alternative, the reflected light from a point may be sensed by one element and emitted light sensed by a different element.

Scanners of the type disclosed in my application Serial No. 674,937 are disposed to provide a dark reference period separating each scan along the reading station line. However, if a reference of different intensity is required, as is the case with the preferred embodiment utilizing glossy reflection, a suitable reference surface of controlled reference reflection or of controlled reference emission may be mounted over the feed track so as to be within the scanning field at one end of the scanning line.

The sensing elements, which are preferably photomultiplier tubes with spectral sensitivity characteristics appropriate to the differentiating quality to be sensed, are used to supply signals to sensitivity regulating apparatus such as disclosed in my application Serial No. 579,594 which are conventionally responsive to the dark period and background for control of their regulating function, but which may be made responsive to dark period and reference reflection or dark period and reference emission so as to provide a controlled sensitivity which is thereby made independent of uncontrolled, but irrelevant variants such as illumination intensity, uncorrected photomultiplier sensitivity, etc.

My said application Serial No. 579,594 describes how automatic threshold adjustment circuitry may be used to automatically compensate for signal intensity variations resulting from characters of different darkness of impression. However, in my present invention, signal intensity variations from one sensing element will contain information about the intensity of one differentiating quality received from the point being scanned. Combination of the signals from all sensing elements by appropriate apparatus of my invention may be used to identify each point scanned as belonging to one of four classes: the printed character, the printed character covered by interference, interference, or background.

The following table gives the approximate relative intensity of energy received under the several preferred embodiments to be described. The numbers 1, 2 and 3 which form the entries in the table are exemplary and serve to indicate only that the energy levels bearing higher numbers are of greater intensity than and may practically be distinguished from energy levels indicated by lower numbers. These exemplary numbers are not intended to indicate true energy levels either experimentally or theoretically determined.

In the following table, the column heading symbols designate categories as follows: A designates characters; B designates characters and interference; C designates interference; and D designates background.

| | A | B | C | D |
|---|---|---|---|---|
| Glossy Characters, Non-Glossy Interference: | | | | |
| Direct reflection | 1 | 1 | 1 | 3 |
| Glossy reflection | 2 | 2 | 1 | 2 |
| Black Characters, Red Interference: | | | | |
| Red Component | 1 | 1 | 2 | 3 |
| Blue Component | 1 | 1 | 1 | 3 |
| Black Characters, Blue Interference: | | | | |
| Red Component | 1 | 1 | 1 | 3 |
| Blue Component | 1 | 1 | 2 | 3 |
| Fluorescent Characters, Non Fluorescent Interference: | | | | |
| Reflected Light | 1 | 1 | 1 | 3 |
| Emitted and Reflected Light, Emission Spectrum | 3 | 2 | 1 | 2 |

When characters possessing the various reflective characteristics, or reflective and emissive characteristics, shown in the table above are passed before the illuminating, scanning and sensing apparatus of my invention, separate signals may be obtained which indicate the degree to which these separate properties are sensed from each point along the scanning line. Further apparatus of my invention may then be used to perform combinatorial operations analogous to the arithmetical operations of addition, subtraction, multiplication and division and other combinatorial operations analogous to the logical operations of logical addition, logical inversion and logical multiplication. In fact several of the operations analogous to the arithmetical operations may be performed in combination or several of the operations analogous to logical operations may be performed in combination or several arithmetical analogous operations and several logical analogous operations may be performed in combination, the particular ones of the operations being appropriate to a particular combination being determined by the degrees to which the differentiating characteristics are possessed by the characters, characters and interference, interference, and background as is taught hereinafter.

Figure 12:
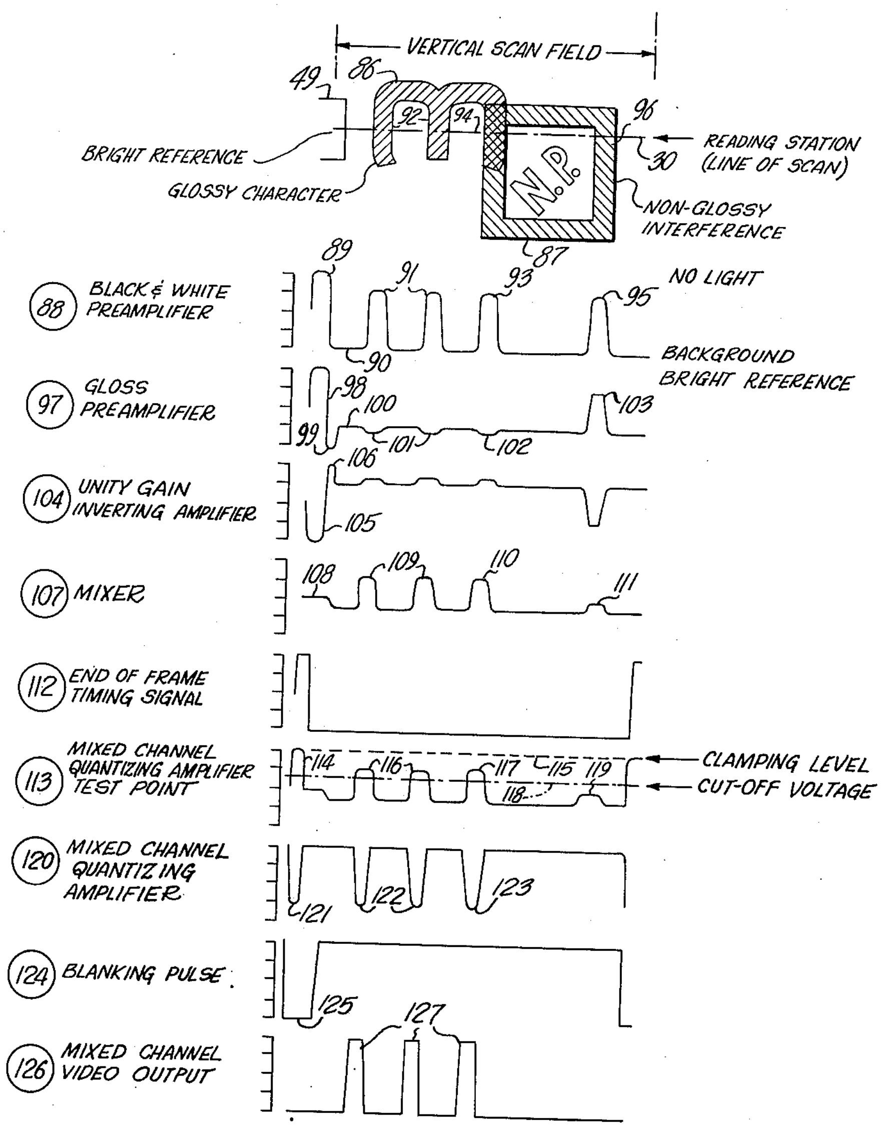
Figure 13:
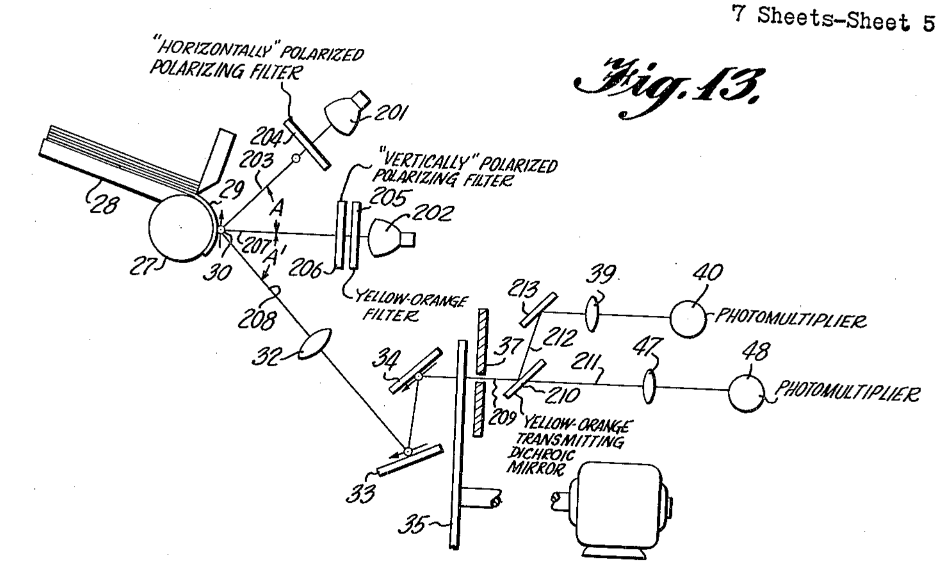
Figures 14, 18:
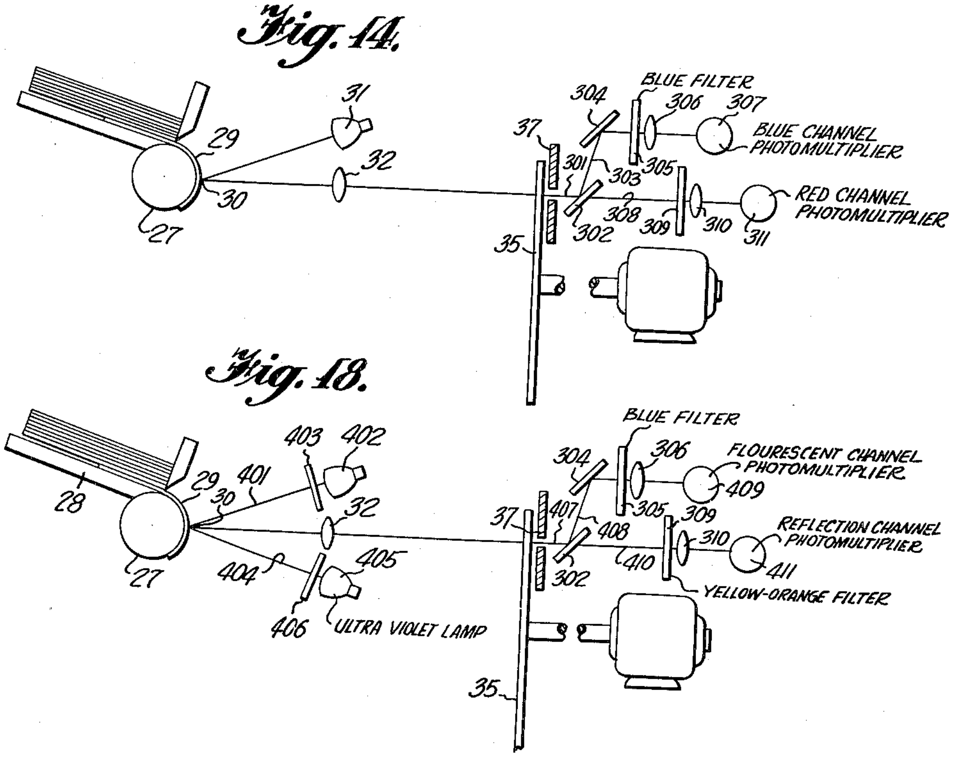
Figure 15:
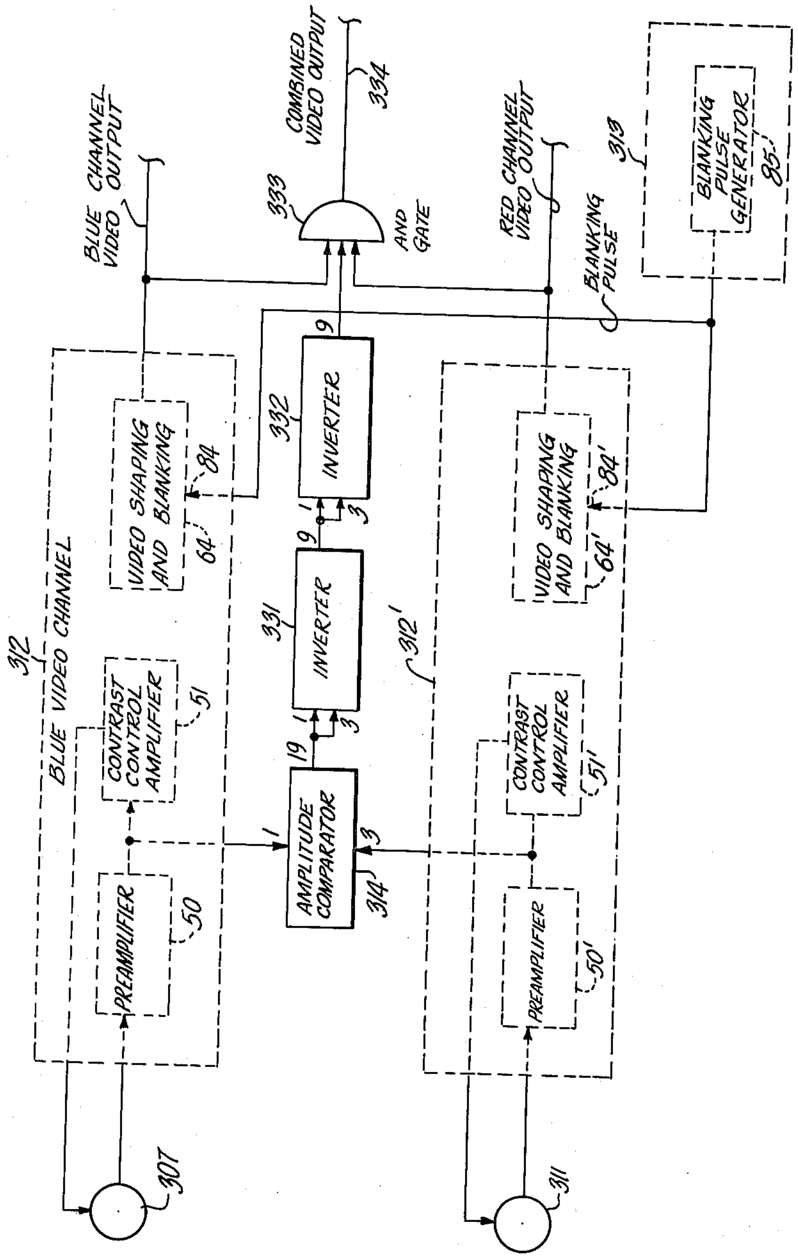
Figures 16, 17:
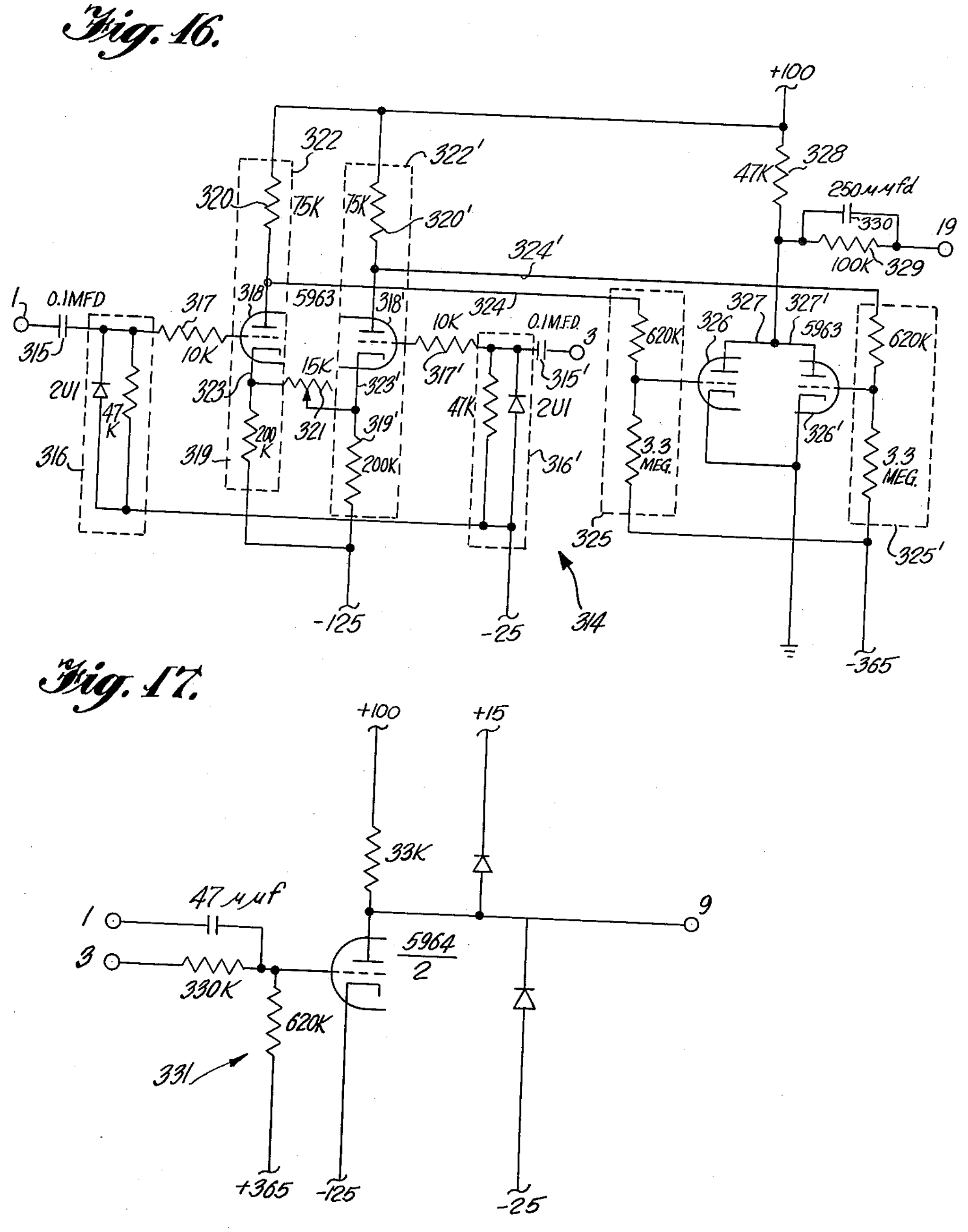

FIGURE 12 is a composite drawing showing at the top an exemplary glossy character and an exemplary non-glossy interfering mark as the same might appear when present spanning the reading station of a preferred embodiment of my invention and showing below the exemplary character and mark selected voltage wave shapes characteristic of the operation of the apparatus of the first preferred embodiment during an exemplary scan along the reading station line of scan, the reading station and the wave shapes all being drawn to the same horizontal scale;

FIGURE 13 is an optical schematic drawing showing the mechanical and optical apparatus of a second preferred embodiment of my invention;

FIGURE 14 is an optical schematic drawing showing the mechanical and optical apparatus of a third preferred embodiment of my invention;

FIGURE 15 is a block diagram showing interconnection of the electronic apparatus of my invention as it may be practiced in its third preferred embodiment;

FIGURE 16 is a schematic circuit diagram showing a form of amplitude comparator circuit suitable for use with my invention;

FIGURE 17 is a schematic circuit diagram of a clipped-output inverter suitable for use with my invention; and FIGURE 18 is an optical schematic drawing showing the mechanical and optical apparatus of a fourth preferred embodiment of my invention.

Figure 1:
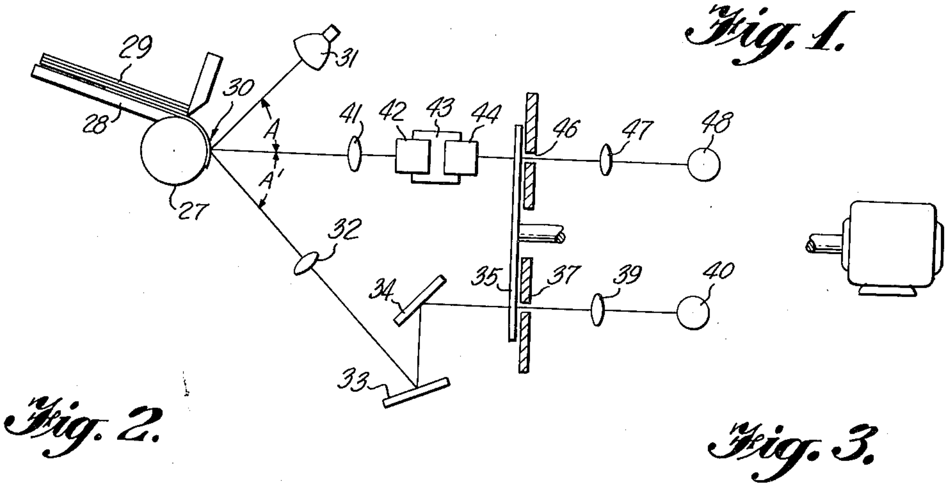
FIGURE 1 is an optical schematic drawing showing the mechanical and optical apparatus of a first preferred embodiment of my invention.
Figure 2:
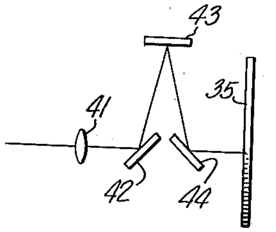
FIGURE 2 is an auxiliary view of a portion of the apparatus of FIGURE 1 showing the arrangement of the image inversion mirrors.
Figure 3:
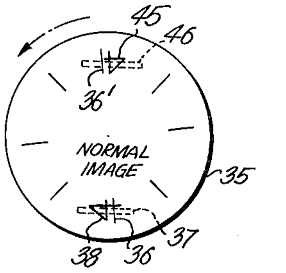
FIGURE 3 is an auxiliary view of the scanning disc included in the apparatus of FIGURE 1 showing the orientation of images projected thereon.

Referring to the drawings, FIGURE 1 shows a scanner such as is disclosed in my said application Serial No. 674,937, suitably modified for a preferred embodiment of my invention when used to differentiate glossy characters from non-glossy interference. The feed wheel 27 removes the checks, 29, from the feed hopper 28 one at a time, passing them in front of the illuminating and scanning apparatus.

The reading station 30 is illuminated by a lamp 31 which is mounted at an angle A from a line normal to the check surface at the reading station. When light is incident upon the check surface at an angle reflection will take place in two different fashions. A certain portion of the light will be reflected by specular reflection, the amount being determined by how closely the surface resembles a smooth mirror surface. As is well known to those skilled in the art, specularly reflected light will be reflected principally along the line forming an angle A′ from the normal, angle A′ being equal to angle A.

A second portion of the incident light will be reflected by diffuse reflection. It is also well known that such reflection will be as if each point on the surface were a new light source, the curve of equal reflection intensity from each point being essentially a hemisphere centered at that point and bounded by the reflecting surface. The intensity of diffuse radiation from each point will be determined by the light absorption at that point.

Light reflected by specular reflection is focused by lens 32 and mirrors 33 and 34 onto the surface of the scanning disc 35. Radial slits 36 and fixed slit 37 combine to transmit the light from an elemental area of image 38 through the defocusing lens 39 to the photomultiplier 40 which is preferably an RCA type 1P21, in a manner already disclosed in application Serial No. 674,937.

The angles A and A′ have been so chosen as to maximize the specular reflection from the check 29 at the reading station line of scan 30 so that a component of the light intensity received will be a measure of the glossy nature of the surface at the point being scanned. While determination of the value of these angles is within the ability of persons skilled in the art, I have found that the optimum value for each of angles A and A′ appears to be about 52°. Also present in the light received at the photomultiplier 40 will be a component of light caused by diffuse reflection and so the total intensity will be determined by both the glossiness of the surface and its absorption.

A portion of the light reflected by diffuse reflection is intercepted by the lens 41 which focuses the inverted image 45 on the scanning disc 35 by means of inverting mirrors 42, 43, and 44. An opposite radial slit 36′ cooperates with fixed slit 46 to transmit the light from an elemental area of the image 45 through the defocusing lens 47 to the photomultiplier 48.

Since the specularly reflected light is concentrated along the line making the angle A with the normal, the light intensity received at photocell 48 will have no specular component and will therefore be a measure of the light absorption only of the point being scanned.

It is an important feature of my invention that scanning according to the several differentiating properties, is so conducted that the several scanning results may be later combined. In this first preferred embodiment I use simultaneous scanning. To accomplish this, the distances along the separate optical paths from the reading station 30 to the images 38 and 45 are made identical. Suitable lenses 32 and 41 are arranged to provide identical magnification ratios. The image inversion mirrors 42, 43, and 44 serve to project the inverted image 45 so that as the slit 36 scans from "top to bottom" of the image 38, the slit 36′ will scan from "top to bottom" of the image 45. It will be noted that the character portion imaged through the lens 41 is, in effect, viewed along an axis extending perpendicular to the tangent to the surface of the feed wheel 27 at the reading station 30, while that portion imaged through the lens 32 is, in effect, viewed along an axis inclined laterally from the first mentioned axis, thus having the effect of compressing the width of the character portion viewed through the lens 32 relative to that viewed through the lens 41. In order that the elemental areas scanned from the two images may be identical in size, the width of fixed slit 46 may be increased over the width of the scanning slit 37 by the factor $$\frac{1}{\cos A'}$$

It will be apparent to those skilled in the art that by suitable care, scanning apparatus possessing the features just recited can be made to perform simultaneous scanning.

Figure 4:
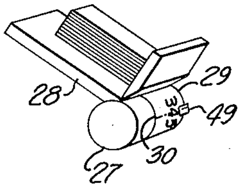
FIGURE 4 is an auxiliary view of a feed apparatus which may be used with my invention showing how a reference element may be placed at one end of the reading station line of scan in the practice of the first, second and fourth preferred embodiments of my invention.

For reasons which will become apparent as the disclosure progresses, it is desirable to have a fixed reference intensity capable of appreciably higher specular reflection than the check background. The auxiliary view of the feed mechanism in FIGURE 4 illustrates the gloss reference strip 49 which may be mounted at the reading station 30 in any desired manner so as to be at one end of the scanning field.

Figure 5:
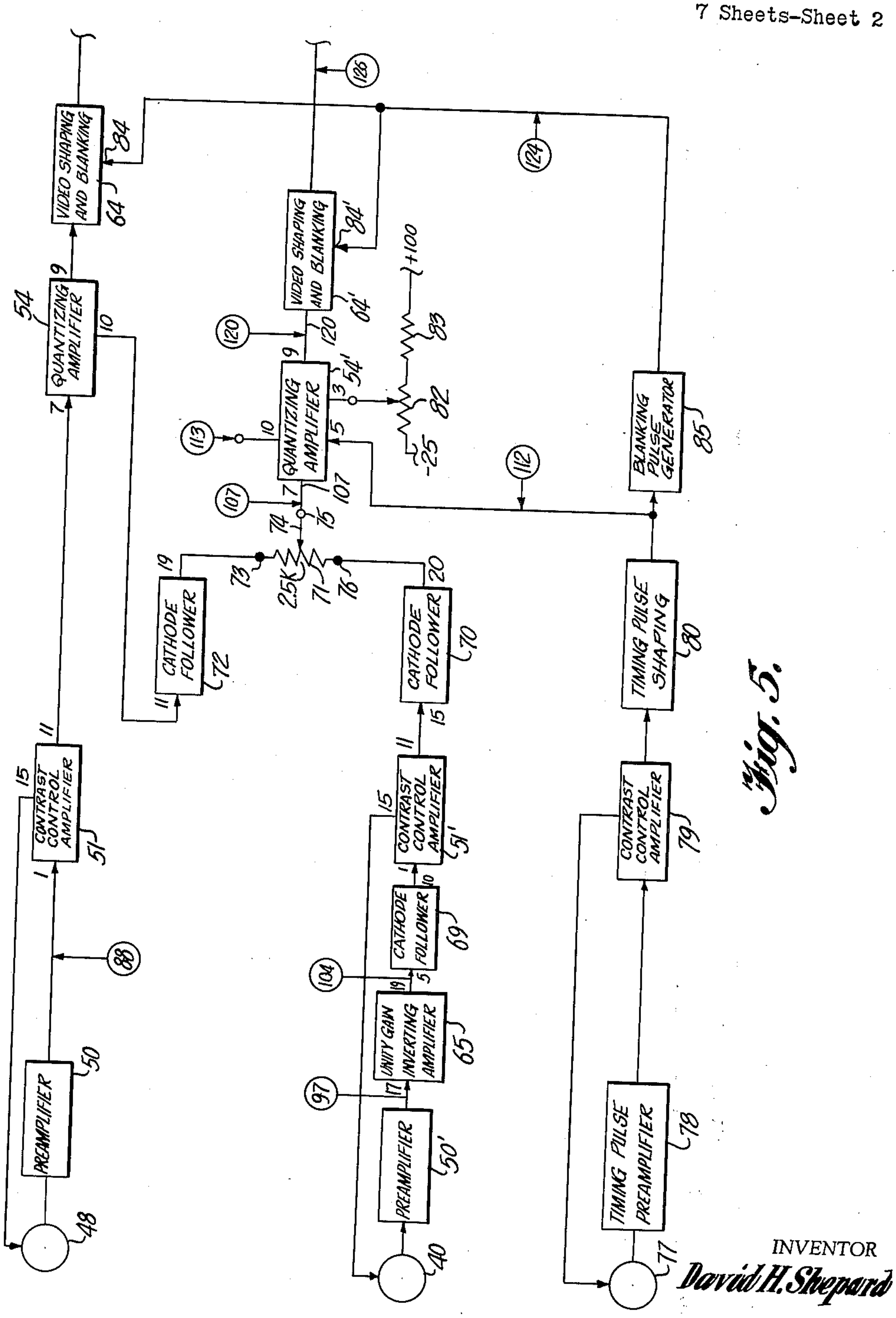
FIGURE 5 is a block diagram showing interconnection of the electronic apparatus of my invention as it may be practiced in its first, second and fourth embodiments.

The interconnection of the various electronic circuits is shown by means of the block diagram of FIGURE 5. The diffuse reflection photomultiplier 48 is identical to the photomultiplier 25 in my said application Serial No. 579,594 and is connected in a circuit in the manner indicated in that application. The preamplifier 50 is identical with the group of circuits bearing the reference characters 39, 40, 41 and 42 described in that application.

Thus far the operation of the circuits is identical with those referenced to my prior patent application Serial No. 579,594. The photomultiplier plate conducts in approximate proportion to the light intensity falling on its cathode. The plate current produces a voltage drop in the plate resistor in a well known fashion, the voltage at the plate reaching its maximum value when no light is received at the photocathode and decreasing in approximate proportion to increasing light. The preamplifier serves to present the same signal, amplified to a peak-to-peak signal level of preferably twenty volts, to the input terminal 1 of a contrast control amplifier 51.

Figure 6:
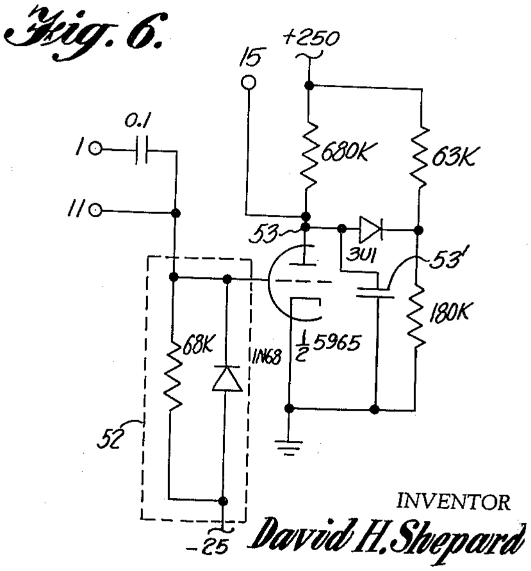
FIGURE 6 is a schematic circuit diagram of a contrast control circuit which may be used in the practice of my invention.

The circuit of the contrast control amplifier 51 is shown in schematic form in FIGURE 6 and operates in the manner described for contrast control tube 44 of said application Serial No. 579,594. The clamping network 52 clamps the negative extremes of the input wave shape to −25 volts and the plate circuit 53 develops a contrast control voltage across capacitor 53' which when applied to the last dynode of the photomultiplier 48 serves to keep the maximum positive excursion at the input terminal 1 approximately twenty volts above the most negative excursion.

The clamped signal at the grid of the contrast control amplifier 51 is connected by means of terminal 11 to the quantizing amplifier 54 through input terminal 7. An exemplary quantizing amplifier circuit is illustrated in schematic form in FIGURE 7. The signal at terminal 7 is coupled to the grid of a conventional cathode follower 55 through a resistor 56, preferably of 33K ohms. The diode 57, resistor 58, diode 59 and terminal 5 of the quantizing amplifier 54 are left unconnected in this embodiment.

The output of cathode follower 55 is capacitively coupled by the 0.05 mfd. capacitor 60 to the clamping circuit 61 where its positive excursions are clamped to a voltage a few volts above ground. The exact value of the clamping voltage is adjusted by the potentiometer **62*a* which with resistor 62*b* forms a voltage divider between plus 100 volts and ground. Since the operation of the contrast control amplifier 51 serves to provide a constant peak-to-peak signal, adjustment of the potentiometer 62*a* serves to determine how many volts above the negative peak voltage a signal must rise in order to cause the quantizing tube 63 to conduct and thus provide an output signal at the quantizing amplifier output terminal 9**.

The quantized signal from terminal 9 of the quantizing amplifier 54 is connected to the video shaping and blanking circuits 64 which comprise a group of circuits identical with those indicated by the reference characters 71, 72, 75, 77, 84, 87 and 88 in said application Serial No. 579,594 and the operation is identical to the operation explained therein, namely to blank out a portion of the signal, shape the pulses and clip them between standard signal levels.

The photocell 48, preamplifier 50, quantizing amplifier 54 and video shaping and blanking circuits 64 comprise the diffuse scanner and video channel. They operate in conventional manner to provide a video signal suitable for character sensing by apparatus such as is disclosed in my copending application Serial No. 399,227, but this signal is not preferred since as it stands, interference marks and characters to be read would both produce video output signals thereby requiring extensive logical apparatus for accurate identification of characters.

Therefore to achieve the objects of my invention I employ the specular channel to provide signals which may be combined with signals taken from the diffuse channel so as to cancel the signals from the interference while preserving the signals from the characters.

The specular channel photomultiplier 40 is identical with the diffuse channel photomultiplier 48. Its output is connected to a preamplifier 50' which is identical with diffuse channel preamplifier 50. The output of the preamplifier 50' is connected to the input terminal 17 of the unity gain inverting amplifier 65 which is shown in schematic form in FIGURE 8. The signal is coupled from the input terminal 17 to one end of the attenuation network 66 by the 0.1 mfd. capacitor 67. The attenuation of network 66 is approximately equal to the gain of the conventional amplifier 68 with the result that the overall signal gain between input terminal 17 and output terminal 19 is approximately unity. Thus the amplifier serves to provide inversion of the input signal without appreciably changing the signal amplitude. Since the inverting amplifier 65 is "in the loop" of the contrast control amplifier 51', small variations of inverting amplifier gain will be compensated.

Figures 7, 8, 9, 10, 11:
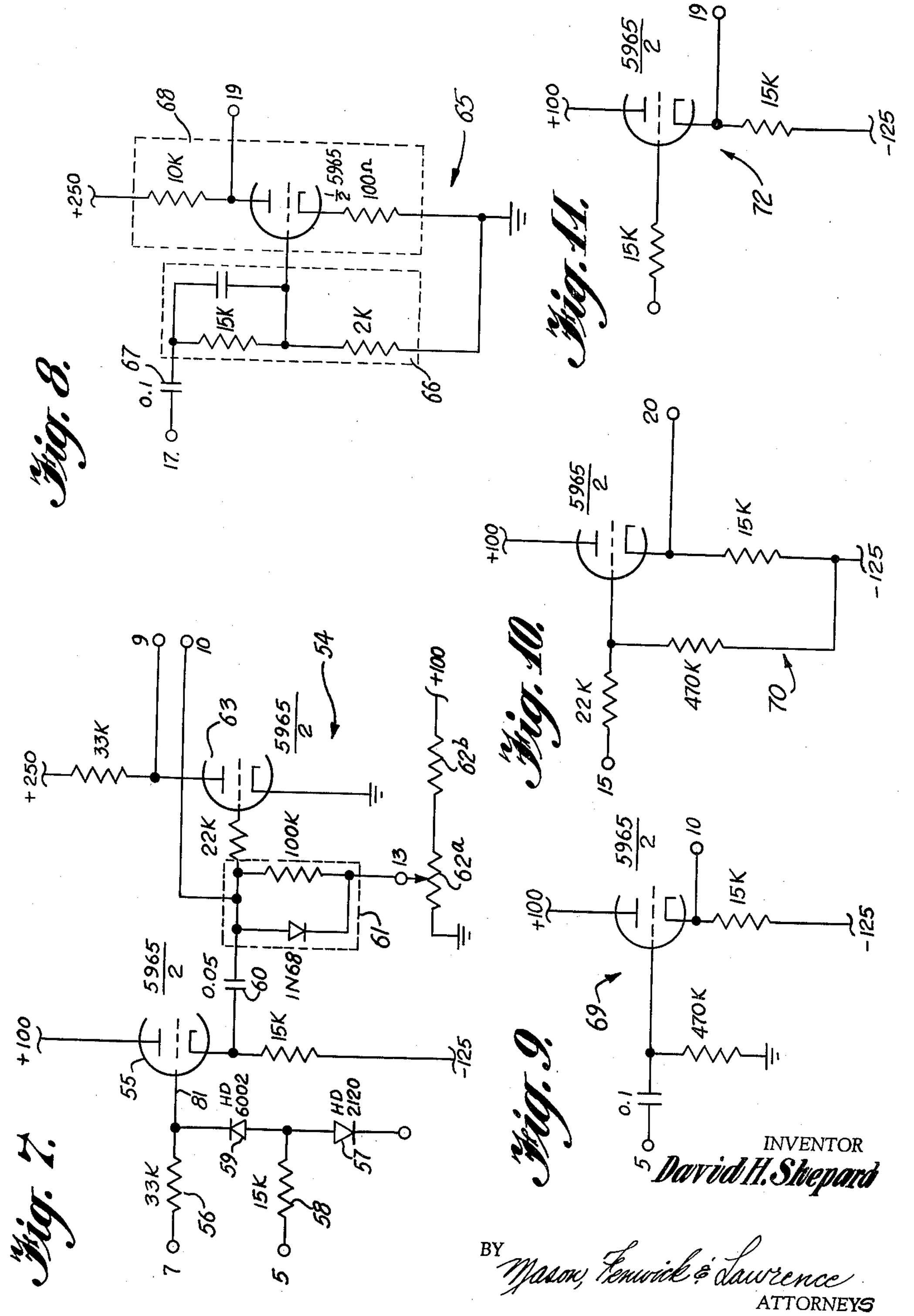
FIGURE 7 is a schematic circuit diagram of a quantizing amplifier circuit which may be used in the practice of my invention.
FIGURE 8 is a schematic circuit diagram of a unity gain inverting amplifier which may be used in the practice of my invention.
FIGURE 9 is a schematic circuit diagram of a capacitively coupled cathode follower which may be used in the practice of my invention.
FIGURE 10 is a schematic circuit diagram of a directly coupled cathode follower which may be used in the practice of my invention.
FIGURE 11 is a schematic circuit diagram of a second type of directly coupled cathode follower which may be used in the practice of my invention.

The inverted signal appearing at the inverting amplifier output terminal 19 is connected to the input terminal 5 of the cathode follower 69 which is of the conventional capacitively coupled type and is shown in schematic form in FIGURE 9.

The output of cathode follower 69 is coupled to the input terminal of contrast control amplifier 51' which is identical with contrast control amplifier 51. The contrast control voltage of voltage terminal 15 is developed across capacitor corresponding to capacitor 53' and applied to the last dynode of specular channel photomultiplier 40 to control the peak-to-peak amplitude of the signal at its contrast control amplifier input terminal 1 in a manner previously described.

The negatively clamped signal available at terminal 11 of contrast control amplifier 51' is connected to the input terminal 15 of the cathode follower 70 shown in the schematic diagram of FIGURE 10. Cathode follower 70 is of the conventional direct-coupled type and serves to preserve the direct voltage levels of its input signal. The output signal at cathode follower output terminal 20 drives one end of the mixing potentiometer 71 which is preferably a 2.5K ohm variable potentiometer.

The positively clamped signal available at terminal 10 of diffuse channel quantizing amplifier 54 is connected to the input terminal 11 of cathode follower 72 which is the direct coupled conventional cathode follower shown schematically in FIGURE 11. The output signal of cathode follower output terminal 19 is used to drive the other end of mixing potentiometer 71, which may be a 2.5K ohm potentiometer.

As is well known in the analogue computing art, a mixing potentiometer connected in the manner of the potentiometer 71 will perform an operation which might be called proportional addition and which may be thought of as being analogous to a combination of the arithmetical operations of multiplication, division and addition.

More specifically, if the resistance measured between diffuse signal terminal 73 of the potentiometer 71 and the adjustable contact 74 is R1 and the resistance between contact 74 and specular signal terminal 76 is R2 there will appear at the mixer output terminal 75 a voltage which follows the expression $$V_m = \frac{R1Vd + R2Vs}{R1 + R2} \quad (1)$$

where $V_m$ is the mixed signal, V*d* is the diffuse signal and V*s* is the specular signal.

It was observed earlier that cathode followers 70 and 72 are directly coupled to their signal inputs from the contrast control amplifier 51' and quantizing amplifier 54 respectively, each of which is delivering a signal which has been clamped to a fixed potential. Thus the mixing potentiometer 71 will mix both the direct and alternating components of their input signals.

It has been suggested and will be explained more fully presently that a dark period occurs in between passage of the scanning slits 36 and 36' over the fixed slits 37 and 46 respectively and the passage of the next appropriate pair of scanning slits. In fact in this embodiment each dark period occurs simultaneously in the two scanning channels resulting in simultaneously occurring positive dark pulses in the output signals of the preamplifiers 50' and 50. In the recitation of circuit functions and connections thus far described it has been shown how the unity gain inverting amplifier 65 accomplishes inversion of the specular channel signal while no equivalent inversion is found to occur in the diffuse channel. Thus the dark pulses of the two channels will be presented to the mixer in opposition or opposite phase, the diffuse channel dark pulse being positive at the mixer terminal 73 and while the specular channel dark pulse at mixer terminal 76 will be negative. The mixing equation 1 shows that either partial or complete cancellation of the dark pulses will result depending on the adjustment of mixing potentiometer 71.

This cancellation of the dark pulses is an undesired consequence of an otherwise desirable arrangement of circuits which will presently be shown to accomplish the desired object of character signal enhancement and interference signal cancellation. In order to compensate for the undesired dark pulse cancellation means are provided for re-insertion of a controlled reference pulse.

The mixed signal available at terminal 75 of mixing potentiometer is connected to the input terminal 7 of quantizing amplifier 54′ which is a circuit identical to the quantizing amplifier 54 shown schematically in FIGURE 7. A $T_f$ timing pulse is furnished at the quantizing amplifier terminal 5 by the timing pulse chain comprised of timing photocell 77, timing pulse preamplifier 78, contrast control amplifier 79, and timing pulse shaping circuits 80. These circuits are identical with corresponding ones of said prior application Serial No. 579,594 as follows: timing photocell 77 is identical with photocell 31 in the prior application; timing pulse preamplifier 78 is identical with the group of circuits indicated by the characters 93, 95, 96, and 97 in the prior application; contrast control amplifier 79 is identical with contrast control amplifier 102 in the prior application. The group of circuits indicated in the prior application by characters 114, 118, 120 and 121 comprise circuits identical with the present timing pulse shaping circuits 80. Operation of these circuits is identical with that explained in the said prior application.

The optical arrangement of apparatus necessary for excitation of the timing photocell 31, while not shown in this application, is identical with the exciter lamp 28, radial bracket or paddle 29 and slit 30 as disclosed and described in my application Serial No. 674,937.

Incidence of the $T_f$ timing pulse which is preferably at plus 15 volts during the pulse and otherwise at minus 25 volts, will tend to raise the grid 81 of the cathode follower tube 55 in quantizing amplifier 54′ to plus 15 volts by means of the resistor 58 and the diode 59. The actual value of the positive excursion caused by the timing pulse is limited by diode 57 to the voltage established by the potentiometer 82 which in cooperation with resistor 83 serves as a voltage divider between −25 and plus 100 volts. The $T_f$ timing pulse is ineffective in the circuit between pulses since its −25 level will cut off both diodes 59 and 57.

The output of cathode follower 55 in the quantizing amplifier 54′ will thus consist of a reference pulse whose amplitude is controlled by the potentiometer 82 followed by the mixed video signals controlled by the mixing potentiometer 71. Otherwise operation of quantizing amplifier 54′ will be exactly as previously described for quantizing amplifier 54 namely, clamping the most positive signal to the voltage established by the potentiometer 62*a*, passing and inverting all signals which fall between the clamping potential and the cut-off potential of amplifying stage 63 and failing to respond to signals below that level.

Output terminal 9 of quantizing amplifier 54′ is connected to the video shaping and blanking circuits 64′ which are identical in circuitry, function and performance to the video shaping and blanking circuits 64.

The blanking pulse furnished to the blanking input terminals 84 and 84′ of the video shaping and blanking amplifiers 64 and 64′ is generated by the blanking pulse generator 85. This generator is identical with the group of circuits 124*a*, 124*b*, 129 and 130 of my application Serial No. 579,594 and operates in a manner identical to that explained in said application.

That the mixing accomplished by the mixing potentiometer 71 will allow quantizing amplifier 54′ to be responsive to signals caused by scanning the glossy character and non-responsive to signals caused by scanning the non-glossy interference may be more readily understood by reference to the wave shapes shown in FIGURE 12. At the top of FIGURE 12 is shown a glossy character 86 and a non-glossy interfering mark 87 at the reading station 30. A number of wave shapes are shown in the figure as they would appear at various circuit points of my invention during a single exemplary scan along the reading station 30.

Wave shape 88 shows the signal as it would appear at the output of the diffuse channel preamplifier 50. The black pulse is identified by the reference character 89 and the background signal level by reference 90. The pulses 91 are observed as the scan passes over the unobscured "horizontal" lines 92 of the character 86. The pulse 93 occurs when the scan passes over the interfering mark where it obscures the character at 94. The pulse 95 results from scanning the interfering mark alone as it appears at 96. It is apparent that the diffuse channel responds equally to characters and interference alike.

The corresponding wave shape at the output of specular channel preamplifier 50′ is identified by the reference character 97. In this signal the black pulse occurs at 98, the bright reference 49 causing the pulse 99 below the background level 100. As the scan passes over the character lines 92, the diffuse reflection received by the photocell 40 is decreased by the absorption of the dark ink, but this decrease is more than compensated by the enhanced specular reflection due to the glossiness of the ink. The slight net gain in light is shown at 101. Where the character is obscured by overstamping at 94 essentially the same results occur. The pulse 102 shows that the overstamping does not detract from the increase in specular reflection which more than counteracts the decrease in diffuse light. That the signal level 100 established by the background is caused essentially by diffuse radiation received in the specular channel is observed at 103 where the scan passes over the interference at 96. Wave shape 97 shows approximately equal response by the specular channel to background, unobscured character, and character obscured by interference, but marked response to the interference where it occurs alone.

The inversion caused by the unity gain inversion amplifier 65 is seen at wave shape 104 which is the inversion amplifier output shape. The black pulse now appears inverted at 105 as is the bright reference 106. Since it is the wave shape 104 which drives the contrast control amplifier 51′ by means of the cathode follower 69, it will be apparent that the voltage difference between points 105 and 106 of the signal will be the peak-to-peak signal which the contrast control seeks to maintain constant. By use of a bright reference which is appreciably higher in specular reflection than the background, the contrast control is allowed to remain undisturbed by occasional extra glossy chaarcters which greatly exceed the background light level and would otherwise affect the contrast control.

It is essentially the wave shapes 88 and 104 which are mixed in the mixing potentiometer 71 to produce the wave shape 107 at the potentiometer output terminal 75. Cancellation of the black pulses may be seen at 108. The effects of glossiness in the specular channel and absorption in the diffuse channel are seen to be rendered additive at 109 and 110. The effective cancellation of the interference by the mixing of the two signals can be seen at 111. While a residual interference pulse is there shown, it is in fact possible by proper adjustment of mixing potentiometer 71 to cause virtually complete cancellation of the interfering signal.

As has been explained earlier, in this embodiment of my invention, the end of frame timing pulse $T_f$ is used to replace the black pulse cancelled by the mixing potentiometer 71. The relative time of this pulse is shown at 112 where it can be seen to begin slightly before the beginning of the black pulse.

The result of introducing a controlled amplitude signal derived from the timing pulse is shown in wave shape 113 at the test point 10 of mixed channel quantizing amplifier 54'. The inserted reference pulse 114 is clamped by the clamping circuit 61' to the voltage level 115 established by the potentiometer 82. In the exemplary scan the character pulses 116 and 117, their level determined by the clamping action and the inserted pulse 114, rise above the cut-off voltage 118 of the quantizer output stage 64' while the residual interference pulse 119 falls below cut-off voltage.

The output wave form 120 of the quantizing amplifier 54' shows the negative pulses 121, 122 and 123 resulting from reference pulse 114, character pulses 116 and 117 respectively bringing the quantizer output stage 63 into conduction.

It then remains to remove the reference pulse and to shape and clip the remaining pulses. The blanking pulse wave shape 124 is generated by blanking pulse generator 85 and operates in video shaping and blanking circuits 84 and 84' to remove the reference pulses in both the diffuse and mixed channel signals. The wave form shows that the negative portion 125 is of sufficient duration to blank these pulses in the manner previously described in application Serial No. 579, 594.

The final mixed channel video output signal 126 shows the sharpened clipped signals 127 from the character only. The reference pulse has been removed by conventional means, but the interference signals have been completely eleminated by the apparatus of my invention.

It will be apparent to those skilled in the art that my invention may encompass a wide variety of forms in its practice and that it is in no way limited by the first preferred embodiment just described. To show that the invention is in no way limited by the scanning apparatus, I now describe a second preferred embodiment wherein the scanning apparatus of FIGURE 1 is replaced by the scanning apparatus of FIGURE 13 which utilizes but a single scanning slit and which incorporates principles of light polarization, and color filtration to accomplish the same ends of the first preferred embodiment, namely that of differentiating between glossy characters and non-glossy interfering marks.

In the drawings and the following discussion, elements which perform identical functions to those of the first embodiment bear identical reference characters while a new series of reference characters beginning with the number 201 is reserved for elements which are first described now.

In the second preferred embodiment the reading station 30 is dually illuminated by the lamps 201 and 202. Illumination from lamp 201 is incident on the reading station along the line 203 which is at an angle A to the reading station surface and this illumination is intended for detecting the specular component of reflectivity. It is well known that specular reflection will result from only that portion of the incident light which is "horizontally" polarized, i.e., polarized parallel to a line lying on the reflecting surface and normal to the line of incidence. As an aid to later separation of specular and diffuse reflections, polarizing filter 204 which is preferably a Kodak Pola-Screen, is placed along the line of incidence 203 and is so oriented as to substantially cut off all light from lamp 201 which is not correctly polarized for the excitation of specular reflection and thus greatly reducing the diffuse reflection due to illumination from lamp 201.

The illumination from lamp 202 is substantially restricted to that lying in the yellow-orange region of the spectrum by the filter 205 which is preferably a Kodak Wratten No. 15 (G). A second polarizing filter 206 which may be identical to filter 204 is so oriented as to pass only the substantially "vertical," (i.e., polarized parallel to a line lying on the reflecting surface and parallel to the plane formed by the lines of incidence 203 and 207) component of the residual illumination received from color filter 205. The light incident along line 207 is intended for detecting the diffuse component of reflection. Use of polarized light of a restricted spectral distribution aids in later separation of specular and diffuse reflections.

The light reflected along the line 208 will consist of one component due to specular reflection which will be essentially horizontally polarized and a second component due to diffuse reflection which will be vertically polarized and of yellow-orange hue. These two components are focused by the lens 32 and directed by the mirrors 33 and 34 to form an image on the scanning disc 35. The scanning disc and the fixed slit cooperate in the manner already described to pass the light 209 from an elemental area of the image onto the dichroic mirror 210, which is preferably a Libbey-Owens-Ford No. 90–440, which primarily reflects wave lengths shorter than yellow and transmits longer wave lengths, the approximate wave length at which transition between reflection and transmission occurs being 510 millimicrons. The dichroic mirror is so oriented that its polarization selectivity favors reflection of the light herein termed "horizontally" polarized while transmitting the vertically polarized light.

Thus light 211 transmitted by the dichroic mirror 210 to the photomultiplier 48 through lens 47 will be the yellow and longer wave length, vertically polarized light which is the result of essentially diffuse reflection only. The light 212 reflected to the specular channel photomultiplier 40 by the dichroic mirror 210, and the mirror 213 through the lens 39 will be the wave lengths shorter than yellow and will be horizontally polarized. In the manner already explained in connection with components of reflection at the reading station 30 due to light from lamp 31 in the first embodiment, the light received at the photomultiplier 40 will have both specular and diffuse components.

Thus the apparatus of FIGURE 13 cooperates to bring about essentially identical results as obtained by the apparatus of FIGURE 1 namely the direction of light from scanning according to diffuse reflection only to the photomultiplier 48 and direction of light from scanning according to combined diffuse and specular reflection to the photomultiplier 40. Yet the arrangement and certain operative principles are quite different in the two apparatus groups.

It will be apparent that the glossy reference 49 of FIGURE 4 serves to render the two groups of scanning apparatus identical in their functional operation. Thus when the group of circuits shown in functional block diagram form in FIGURE 5 are connected to the photomultipliers 40 and 48, in the manner already described, these several circuits will operate as previously described, the wave shapes of FIGURE 12 being characteristic in the already indicated manner and the suppression of interference-caused signals and preservation of character-caused signals will be obtained as has already been fully explained.

In order to show that my invention is neither limited by the differentiating characteristics used, nor restricted to arithmetical types of signal combinations, I now describe a third preferred embodiment which will distinguish between characters printed in black and colored interfering marks, wherein the scanning apparatus of FIGURE 14 is used. Both arithmetical and logical types of signal combinations will be shown. The reference characters which identify elements identical with the first embodiment will bear the reference numbers used in explanation of the first embodiment. A series of numbers beginning with 301 is used to identify elements peculiar to this third embodiment.

As before, checks to be read are fed to the reading station 30 of FIGURE 14. Illumination from the lamp 31 has a spectral distribution appropriate to the interference colors to be discriminated. In this embodiment the spectral distribution spans the visible spectrum since interference of any color may be encountered. Light reflected from the reading station 30 is imaged on the scanning disc 35 by the lens 32 as previously explained. The scanning disc cooperates with the fixed slit 37 to direct light 301 from an elemental area onto the red transmitting, blue reflecting dichroic mirror 302 which is preferably a Libbey-Owens-Ford Blue Reflecting Dichroic Mirror #90–400 having a cross-over wave length of approximately 520 millimicrons.

In a well known manner dichroic mirror 302 reflects light 303 which contains a large portion of the incident light 301 having wave length shorter than 520 millimicrons and only a small portion of the light 301 having longer wave lengths. The reflected light 303 is redirected by mirror 304 through filter 305 and defocusing lens 306 to the blue channel photomultiplier 307. The filter 305, which is preferably a Corning Blue Glass Filter, Spec. #5–61 Filter #5562, serves to greatly attenuate the transmission of the longer wave lengths leaving substantially only that light having wave lengths shorter than 520 millimicrons.

In an equally well known manner, the light 308 transmitted by dichroic mirror 302 contains a large portion of the wave lengths longer than 520 millimicrons and a small portion of the shorter wave lengths. The light 308 is transmitted through filter 309 and defocusing lens 310 to red channel photomultiplier 311. The color filter 309 is preferably a Corning Red Glass Filter, Spec. #2–63, Filter #2424 which effectively rejects the blue components of the light 308. The purpose of filters 305 and 309 may be more clearly understood if they are considered as "cross-talk" filters which serve to reinforce the signal separating characteristics of dichroic mirror 302.

I have thus shown that the apparatus of FIGURE 14 causes a component of light of wave length less than 520 millimicrons to impinge upon blue channel photomultiplier 307 and a component of light of longer wave lengths to impinge upon red channel photomultiplier 311, thus effectively dividing the light into two components which are substantially mutually exclusive.

The blue channel photomultiplier 307 and the red channel photomultiplier 311 are electrically connected to circuitry for preserving signals resulting from scanning of black characters and for cancelling signals resulting from scan of colored interfering marks in the manner indicated by the block diagram FIGURE 15. In the figure those circuits common to the first preferred embodiment have been shown in broken lines. Groups of circuits previously explained have been enclosed by broken lines. New circuit elements peculiar to this embodiment are shown with continuous lines. The previously explained circuit elements to which the new circuit elements are connected are suitably shown in broken line form within the larger circuit groups to which they belong.

The blue channel photomultiplier 307 and red channel photomultiplier 311 are connected to blue video channel 312 and red video channel 312′ respectively. The channels 312 and 312′ are identical with the previously described diguse channel and are each comprised of a preamplifier 50, contrast control amplifier 51, quantizing amplifier 54, and video shaping amplifier 64. The blanking pulse applied to terminals 84 and 84′ of video shaping and blanking circuits 64 and 64′ is generated by the timing channel 313 of which the last stage only, blanking pulse generator 85, is shown.

Each of the channels 312 and 312′ operate in a manner already explained. Neither of these channels would provide signals preferred for use by character sensing apparatus since normally one or both channels would respond to colored interference.

To overcome this disadvantage I have added the circuitry which I now explain which cooperates with the apparatus of channels 312 and 312′ to eliminate response to colored interference.

The preamplifier output signals from blue preamplifier 50 and red preamplifier 50′ are connected to input terminals 1 and 3 respectively of the amplitude comparator 314 which is shown schematically in FIGURE 16. Comparator 314 is a differential amplifier which will deliver a low positive voltage at output terminal 19 whenever the signals at its input terminals 1 and 3 differ by more than a fixed amount. Otherwise the output signal will be at a very high positive voltage.

The input signals at terminals 1 and 3 are coupled by capacitors 315 and 315′ to clamping networks 316 and 316′ which clamp the negative extremes of their respective signals at −25 volts. The clamped signals are coupled to the control grids of tubes 318 and 318′. The cathode resistors 319 and 319′ of these tubes are observed to be relatively large, preferably 200K, while their plate resistors 320 and 320′ are smaller, preferably 75K. Neglecting momentarily the action of the sensitivity adjusting variable resistor 321, it will be observed that the operation of the stages 322 and 322′ will be more nearly that of cathode followers than of conventional amplifiers, nearly three times as much signal voltage being developed across the cathode resistors 319 and 319′ as across the plate resistors 320 and 320′.

The very large resistance value cathode resistors require only very small changes in tube current to effect large changes in cathode voltage and thus only small changes in grid-to-cathode voltage will occur. Therefore the cathodes will very closely follow their grids, each stage normally operating quite close to cut-off. So long as both grid voltages are substantially the same, both cathodes will follow their signals, both plates experiencing about one-third of the cathode voltage changes.

If the input signals are unequal, as for example if the signal at input terminal 1 is 3 volts more positive than the signal at input terminal 3, it then becomes necessary to consider the action of sensitivity adjusting resistor 321. The cathode 323 will attempt to be approximately 3 volts more positive than cathode 323′ thus causing current to flow through resistor 321 which current will flow through cathode resistor 319′. This current will raise the cathode 323′ above that determined by the tube 318′ and its input signal. When the resistor 321 is adjusted properly, it is possible to so elevate the cathode 323′ that a signal difference of 3 volts will be more than ample to cut off the tube 318′. When this occurs, the plate of tube 318′ goes to a very high positive value very close to the plate supply voltage of plus 100 volts.

In a similar manner, if the input at terminal 3 is 3 volts more positive than the input at 1, the tube 318 will be cut off by the action of cathode resistor 319′ and the sensitivity adjusting variable resistor 321 and the plate of 318 will take on a high positive value. In practice it has been found possible to have one tube cut-off the other when a signal difference less than the exemplary 3 volt difference obtains.

Thus when the two input signals differ by a few volts, one or the other of the tubes 318 and 318′ will be cut-off and its plate will experience a change to a high positive value which will persist until substantial equality of input signals is restored.

The voltage at the plates of tubes 318 and 318′ are coupled through leads 324 and 324′ to voltage dividers 325 and 325′. These dividers serve to keep the triodes 326 and 326′ cut-off whenever their associated tubes 318 and 318′ respectively are conducting. When either 318 or 318′ is cut-off its high plate voltage will cause either the tube 326 or 326′ to conduct. Since the plates 327 and 327′ are connected in parallel, conduction of either tube will cause a voltage drop through their common plate resistor 328 which will be coupled to the amplitude comparator output terminal 19 by resistor 329 and capacitor 330. Thus the comparator output will be high except when the input signals are unequal by more than a selected voltage difference.

The output terminal 19 of amplitude comparator 314 is connected to the input terminals 1 and 3 of the inverter 331 which is the conventional clipped output inverter shown in FIGURE 17. Its output at terminal 9 will be down at −25 volts except when the output of amplitude comparator 314 goes down at which time inverter output terminal 9 will go up to plus 15.

The output terminal 9 of inverter 331 is connected to input terminals 1 and 3 of inverter 332. Inverter 332 is identical with inverter 331. Its output will be at −25 when the output terminal 19 of amplitude comparator 314 is at its low positive level and will be up at plus 15 when the amplitude comparator output is at its high positive level. The object of inverters 331 and 332 is to provide a signal operating between standard logical voltage levels suitable for use in gating circuits.

Output terminal 9 of inverter 332 provides one input to AND gate 333 which may be a conventional diode AND gate such as one of the comparators 56 of my copending application Serial No. 399,227. The blue channel video output signal and red channel video output signal available at the output terminals of video shaping and blanking circuits 64 and 64′ respectively comprise the other inputs to AND gate 333. The combined video output of AND gate 333 will be up only when a mark on the document 29 has caused an output in both the blue and red video channels 312 and 312′ respectively and when the output of inverter 332 is up indicating that the outputs of preamplifiers 50 and 50′ are substantially equal.

The apparatus just described will produce a combined video output pulse on lead 334 for the scanning of a mark on a document if and only if that mark satisfies the three requirements imposed by the apparatus. The mark must be dark enough in the blue channel 312 to cause a blue channel video output pulse. The mark must be dark enough in the red channel 312′ to cause a red channel video output pulse. The mark must appear to have substantially the same darkness in both channels.

While this embodiment is disposed to distinguish against all hues, it is not possible for this discussion to treat all possible cases in the continuum of hues. However a few cases individually considered will serve to reveal the operation of my invention.

Consider first the operation when the check background is intercepted by the scanner. The background will be highly reflective (compared to either black characters or colored interfering marks). The combined response of a tungsten light source, the color separation optical system and the S4 spectral sensitivity of the 1P21 photomultipliers yields approximately equal background signal levels for the two channels when a white background is scanned. Since the conventional operation of the contrast control amplifiers 51 and 51′ is to maintain the background signal level at a fixed voltage difference from the black pulse, the backgrounds will appear equal to the apparatus even when the background has a pronounced tint.

When the scanner intercepts black characters, reflection will be reduced across the entire sensible spectrum. Each channel will be darkened sufficiently to cause a video output signal. The darkening will be substantially equal in both channels. All three conditions necessary for a combined video output are obtained and an output signal will result.

If the scanner intercepts interference of a color which is entirely within one of the color channels such as blue or red, the colored reflection will cause reduced darkening in its own channel. Thus red reflection will cause a red mark to appear appreciably less dark in the red channel than in the blue channel. However, the absorption still may be sufficient to cause video output signals from both channels. The amplitude comparator 314 will sense the amplitude difference between the two preamplifier pulses and cause inverter 332 to prevent signals from passing through AND gate 333. No output signal will result.

When the scanner intercepts an interference of a color which is partly within each channel, the darkening will appear approximately equal in both channels. For example, a green overstamping may cause a blue component of reflection sensed by the blue channel and a yellow component of reflection sensed by what I have nominally called the red channel, but which extends into the yellow region. While it might normally be expected that such a color, being nearly equally effective in darkening both channels, would be treated as a black mark, I find in practice that pigments used for stamp inks of these colors are less absorbing than those used for colors entirely within either the red or blue channel sensitivity range. Thus while the signals are nearly equal, the darkening in one or both channels will be insufficient to cause video output signals. Thus no combined output signal will result.

As I have just shown, the third preferred embodiment by requiring equal darkening in both blue and red channels, and by requiring sufficient darkening in both channels to cause video output signals in both, is thereby able to distinguish between black characters and colored interfering marks.

The several embodiments described thus far have depended on naturally occurring differentiating criteria. I now show, by means of a fourth preferred embodiment, how my invention may be practiced using characters to which a differentiating characteristic has been deliberately added, namely characters which have been written with an ink containing both pigments and fluorescent phosphors. Such characters will appear black under normal illumination, but will radiate energy of a known wave length when subject to illumination of proper exciting wave length.

It is important to achieve separation between the radiant energy indicative of fluorescence and the reflected energy indicative of absorption. While it is possible to achieve such separation by scanning the document at two separate scanning stations and applying a suitable delay equal to the time interval between the separate scannings so that both scanning signals are rendered time coincident, I have, for reasons of simplicity and continuity with ideas already expounded, chosen to use simultaneous scanning as in the previous embodiments. In this embodiment, separation is achieved by using a fluorescent phosphor which emits light at one end of the visible spectrum, and by examining reflected light received over a portion of the remaining spectrum. Specifically, I use a phosphor which emits in the blue-violet region and examine reflected light received in the yellow-orange-red region of the spectrum. Other phosphors and other appropriate spectral regions could, of course, be used, the present phosphor and spectra being exemplary.

The scanning apparatus of this embodiment is shown in FIGURE 18. A new series of reference characters beginning with the number 401 are used for elements new to this embodiment while elements identical with those of the preceding embodiments are identified by the reference characters of their corresponding precedent elements.

Light for the detection of absorption and reflection is directed toward the document 29 at the reading station 30 along line 401 by lamp 402. Interposed between the lamp and the reading station is a filter 403 which may be a Kodak Wratten 15G and which passes light with wave length longer than 510 millimicrons. Light for detection of fluorescence is directed toward the reading station 30 along line 404 by lamp 405 which is preferably a Sylvania F6T5/BL and is rich in an ultraviolet radiation to which the fluorescent phosphor responds. A filter 406 which may be a Corning Filter #5874 and which transmits ultraviolet light and attenuates light in the visible spectrum serves to substantially attenuate the visible light reaching the reading station along the line 404.

The lens 32 focuses both the reflected and emitted light from the reading station to form an image on the scanning disc 35. Light 407 from the elemental image area defined by the cooperative action of the disc 35 and the slit 37 is directed on the blue reflecting dichroic mirror 302 of the type already described. The reflected light 408 which will consist principally of the phosphor-emitted light, is redirected by mirror 304, through cross-talk filter 305 and defocusing lens 306 to the fluorescent channel photomultiplier 409.

The transmitted light 410 passes through cross-talk filter 309 and defocusing lens 310 to reflection channel photomultiplier 411. The photomultiplier 411 will receive essentially that light which has been reflected by the document. Thus the emitted and reflected light is separately received by the photomultipliers 409 and 411 respectively.

In this embodiment, it is necessary to provide a bright reference located in a manner identical to that of the reference 49 of the first and second embodiments. The reference element may be conveniently rendered operative in the fluorescent channel by coating it with the same fluorescent phosphor as is used in the ink. This reference then provides a control emission responsive to any variation in ultraviolet excitation intensity and is present in the scanning field whether or not a fluorescent character is passing before the scanner. The reference emission may be used by the contrast control amplifier 51′ to effect contrast control in the manner already described for the first preferred embodiment.

The electronic apparatus of the first embodiment may be used with the illumination, scanning, separation and sensing apparatus of the present embodiment the fluorescent channel photomultiplier 409 being connected to preamplifier 50′ in lieu of specular channel photomultiplier 40 and the reflection channel photomultiplier 411 replacing diffuse channel photomultiplier 48 as input to preamplifier 50.

Operation of the present embodiment may be understood by examining the reflection and emission combinations characteristic of the four possible conditions sensed on the document, namely: background, characters, interference, and interference on top of character. These four combinations can then be traced through the combining apparatus to their combined video output results.

When the background is scanned, its relatively high reflectance will cause a low voltage at the output of reflection channel photomultiplier 411. Despite the operation of filter 406, there will be an appreciable component of light at the reading station 30 of wave length which may reach fluorescent channel photomultiplier 409 by reflection from dichroic mirror 302 and transmission of filter 306 when reflected by the high reflectance of the document background. This residual light reflected in the fluorescent channel will produce a low voltage at the output of fluorescent channel photomultiplier 409, but not as low a voltage as that produced by the fluorescent reference 49 when it is scanned.

By means of the previously described apparatus, the reflection channel photomultiplier output signal will be presented, suitably amplified and clamped, to the terminal 73 of the mixing potentiometer 71 and the fluorescent channel photomultiplier output signal after amplification, inversion and clamping, will be presented to the terminal 76 of the mixing potentiometer.

The voltage level which the two background signals produce at mixer terminal 75 will be such that after reinsertion of a reference pulse at quantizing amplifier 54′, no mixed channel video output pulse will result.

When the scanner intercepts a character written in the preferred ink and phosphor mixture, absorption will cause a positive signal (relative to the background) in the reflection channel photomultiplier output while fluorescent emission will cause a signal more negative than the background in the fluorescent channel photomultiplier output. The mixer output caused by these two signals operating on their respective apparatus groups will be such as to greatly exceed the voltage level in the quantizing amplifier 54′ necessary to produce a mixed channel video output pulse.

If the scanner scans across an interference mark, the absorption of the mark will cause a positive signal in the reflection channel photomultiplier output. In the fluorescent channel however, no fluorescence will be observed and in fact the absorption, by the mark, of what I have termed residual light will cause the fluorescent channel photomultiplier output to be more positive than that obtained when the background is scanned. At the mixer, the interference signals cancel each other and no video output pulse results.

When interference on top of the fluorescent character is scanned, the fluorescent emission usually undergoes little or no attenuation by the interference. In cases of heavy interference, the attenuation may be sufficient to reduce the fluorescent channel photomultiplier output to the voltage level observed when scanning the background. The reflection channel photomultiplier will, of course, deliver a positive signal (referenced to the background) due to absorption.

In the case cited above, the signal at the mixer output will still be sufficiently above the required quantizing level to cause a mixed channel video output pulse. In the cases more generally encountered, the mixer output signal will greatly exceed the quantizing voltage level.

It is apparent that in the four cases just considered, the apparatus of the fourth preferred embodiment of my invention will preserve the signals resulting from scanning characters formed with a mixture of ink pigments and fluorescent phosphors even in cases of heavy interference while completely cancelling signals due to the scanning of interfering marks.

It will be obvious to those skilled in the art that many forms of my invention may be practiced without departing from the spirit of the invention. For example, where I show one reading station being scanned according to each of two differentiating characteristics, a plurality of reading stations may each be scanned according to a number of characteristics and suitable interference-free signals developed for each of the reading stations by combining the separate signals from each station in combinations appropriate to the characteristics sensed. Similarly other scanning rasters may be devised for use with my invention and different scanning and sensing means employed. While the characteristics of specular and diffuse reflection, color components and fluorescent emission have been recited as exemplary differentiating criteria, other criteria may be adopted for use with my invention. While the preferred embodiments of my invention have been arranged for use with automatic character sensing apparatus, the invention may be equally applied to facsimile, television, photocopying, photography, and other arts. Nor need the character sensing application of my invention be restricted to overcoming interference since for example, it can equally be applied to differentially signalling form lines and reference marks for appropriate processing by the character sensing apparatus. Therefore I desire that only such limitations be placed on my invention as are imposed by the claims and the prior art.

What is claimed is:

1. A method for scanning intelligence bearing documents and differentially signalling the scanning of indicia wherein the indicia possess a plurality of sensible attributes in different combinations comprising the steps of exciting the indicia to display said sensible attributes in the combinations possessed by the indicia, scanning the elemental areas of the documents, sensing selected combinations of said sensible attributes, separately signalling the scanning of different combinations of the sensible attributes displayed by sensing signals indicative of selected combinations of the sensible attributes, combining the sensing signals according to a preselected combining function, and signalling at least one combined signal differentially indicative of the scanning of indicia displaying said sensible attributes in preselected combinations.

2. A method of scanning documents having intelligence bearing characters and interference markings thereon wherein the characters and markings are imprinted in materials having selected optical properties by which the characters are distinguishable independently of shape from the markings and differentially signalling the scanning of the indicia, comprising the steps of illuminating the characters and markings to cause them to display their associated selected optical properties, scanning the elemental areas of the documents, separately signalling the scanning of the characters and markings by sensing signals representative of the selected optical properties of the characters and sensing signals representative of the selected optical properties of the markings, combining the said sensing signals according to a preselected combining function, and signalling a combined signal representative of the scanning of the characters only whereby signal representations of the scanning of the markings are eliminated from said combined signal.

3. Apparatus for scanning intelligence bearing documents and differentially signalling the scanning of indicia possessing a plurality of sensible attributes in different combinations, comprising exciting means for causing said indicia to display said sensible attributes in the combinations possessed, scanning means responsive to a display of said sensible attributes for scanning elemental areas of the documents and separately signalling the scanning of differential combinations of the attributes displayed including a plurality of sensing means each responsive to a selected combination of said sensible attributes and separately signalling a sensing signal indicative of the selected combination in the degree sensed and, differentially responsive separating means for selectively directing differential combinations of said sensible attributes to selected ones of said sensing means, combining means responsive to a plurality of said sensing signals for combining sensing signals according to a preselected combining function and signalling at least one combined signal differentially indicative of the scanning of indicia displaying said sensible attributes in preselected different combinations.

4. Apparatus for scanning intelligence bearing documents having intelligence bearing characters thereon and interference markings, wherein the characters display sensible properties which are distinguishable from sensible properties displayed by the interference markings, comprising exciting means for causing the characters and interference markings to display their respective distinguishable sensible properties, scanning means responsive to display of the sensible properties of the characters and interference markings for scanning elemental areas of the documents and separately signalling the scanning of distinctive sensible properties of the characters and the scanning of distinctive sensible properties of the interference markings including first sensing means responsive to selected distinctive sensible properties displayed by the characters for signalling a sensing signal indicative of scanning of a character, second sensing means responsive to selected distinctive sensible properties of the interference markings for signalling a sensing signal indicative of scanning of an interference marking and means for selectively directing distinctive combinations of said sensible properties to selected ones of said sensing means, combining means responsive to a plurality of said sensing signals derived from said first and second sensing means for combining said sensing signals according to a preselected combining function including means signalling at least one combined signal indicative of the scanning of characters only and eliminating signals indicative of scanning of interference markings.

5. A scanning apparatus for scanning documents having intelligence bearing characters and interference markings thereon to produce output signals for automatic character sensing equipment which are freed of the interference, wherein the characters imprinted on the documents exhibit a relatively glossy quality and the interference markings exhibit a relatively non-glossy quality, comprising a reading station, illuminating means for illuminating the document portion at the reading station to cause the characters and interference markings to reflect light by specular reflection and by diffuse reflection, scanning means for scanning elemental areas of the documents at the reading station and producing scanning signals in response to the light reflected therefrom including first sensing means responsive to specular reflection for producing a sensing signal indicative of the light reflected by specular reflection during scanning of the documents and a second sensing means responsive to diffuse reflection for producing a sensing signal indicative of the light reflected by diffuse reflection during scanning of the documents, differentially responsive separating means for selectively directing specular reflected light and diffuse reflected light at least in part along separate optical paths to said first and second sensing means, and combining means responsive to the signals produced by said first and second sensing means for combining the sensing signals in selected time relation and polarity according to a preselected combining function to cancel sensing signals resulting from scanning of the relatively non-glossy markings and produce a combined output signal representing only the sensing signals derived from scanning of the characters.

6. Scanning apparatus for scanning documents having intelligence bearing characters and interference markings thereon to produce output signals for automatic character sensing equipment which are freed of the interference, wherein the characters imprinted on the documents exhibit a relatively glossy quality and the interference markings exhibit a relatively non-glossy quality, comprising a reading station, first illuminating means for illuminating the document portion at the reading station positioned to reflect light therefrom along a selected optical path by specular reflection, second illuminating means separated from said first illuminating means and positioned to cause said document portion to reflect light along said path by diffuse reflection, scanning means for scanning elemental areas of the documents at the reading station and producing scanning signals responsive to the scanning of glossy and non-glossy attributes of the characters and markings including first sensing means responsive to specular reflection for producing a sensing signal indicative of the light reflected by specular reflection along said path and second sensing means responsive to diffuse reflection for producing a sensing signal indicative of the light reflected by diffuse reflection along said path, separating means for selectively directing specular reflected light and diffuse reflected light from said selected optical path along separate optical path to said first and second sensing means respectively, and combining means responsive to the signals produced by said first and second sensing means for combining the sensing signals in selected time relation and polarity according to a preselected combining function to cancel sensing signals resulting from scanning of the relatively non-glossy markings and produce a combined output signal representing only the sensing signals derived from scanning of the characters.

7. The combination recited in claim 6 wherein means are provided for polarizing the light from said first illuminating means to said reading station along a first polarization axis and means are provided for polarizing the light from said second illuminating means along a second polarization axis differing from said first polarization axis, color filter means are provided for restricting the light from one of said illuminating means to a selected range of sensible spectral frequencies, and said separating means includes color filtration means and means selected to a selected polarization axis for directing reflected light originating from one of said illuminating means to said first sensing means and separately directing the diffuse reflected light originating from the other of said illuminating means to said second sensing means.

8. A scanning apparatus for scanning documents having intelligence bearing characters and interference markings thereon to produce output signals for automatic character sensing equipment which are freed of the interference, wherein the characters imprinted on the documents exhibit a relatively glossy quality and the interference markings exhibit a relatively non-glossy quality, comprising a reading station, illuminating means for illuminating the document portion at the reading station to cause the characters and interference markings to reflect light along a selected specular reflection axis and along a selected diffuse reflection axis inclined to said first mentioned axis, scanning means for scanning elemental areas of the documents at the reading station and producing scanning signals in response to the light reflected therefrom including first sensing means responsive to specular reflection for producing a sensing signal indicative of the light reflected by specular reflection during scanning of the documents and a second sensing means responsive to diffuse reflection for producing a sensing signal indicative of the light reflected by diffuse reflection during scanning of the documents, means for selectively directing light from said specular reflection axis to said first sensing means and light from said diffuse reflection axis to said second sensing means along separate optical paths, and combining means responsive to the signals produced by said first and second sensing means for combining the sensing signals in selected time relation and polarity according to a preselected combining function to cancel sensing signals resulting from scanning of the relatively non-glossy markings and produce a combined output signal representing only the sensing signals derived from scanning of the characters.

9. Scanning apparatus for scanning documents having indicia thereon including intelligence bearing characters imprinted in black ink and interference markings imprinted in ink of a selected color and spectral frequency range and differentially signalling the scanning of the indicia so as to produce output signals freed of the interference for application to automatic character sensing equipment, comprising a reading station, illuminating means having a spectral distribution spanning a greater portion of the sensible spectrum than that occupied by the color of the colored ink for illuminating the document portion at the reading station, scanning means responsive to the light reflected from the document portion at the reading station for scanning elemental areas of the document and signalling the scanning of colored and black and white areas on the document including first sensing means responsive to reflected light of a color lying within the frequency range of the colored ink and second sensing means responsive to colored light of a frequency lying outside of said frequency range, means in the path of the light reflected from said reading station for directing the light having a frequency within said selected frequency range to said first sensing means and directing the light having frequency outside of said selected frequency range along a separate path to said second sensing means, an and gate, means for coupling the sensing signals produced by said first and second sensing means to said and gate, and comparator means responsive to the signals produced by said first and second sensing means for comparing the amplitudes of said signals in selected time relation having means for opening said and gate to provide a combined output signal from said sensing signals when the difference between their amplitudes is a selected value and to prevent opening of said and gate when the difference between the amplitudes of the sensing signals produced by said first and second sensing means exceeds a selected value.

10. Scanning apparatus for scanning documents having indicia thereon including intelligence bearing characters imprinted in fluorescent ink and interference markings imprinted in non-fluorescent ink and differentially signalling the scanning of the indicia so as to produce output signals freed of the interference, combining a reading station, first illuminating means producing ultra violet light to cause the fluorescent ink to emit light in the long wave length region of the sensible spectrum, second illuminating means for emitting light extending into the short wave length region of the sensible spectrum illuminating the reading station to cause the characters and interference markings to reflect light, scanning means for scanning elemental areas of the document at the reading station and producing scanning signals including first sensing means responsive to light in the short wave length region of the spectrum and producing a sensing signal indicative of the light reflected from the document from the reading station and second sensing means responsive to light in the long wave length region of the sensible spectrum for producing a sensing signal indicative of the light emitted by the fluorescent ink characters, differentially responsive separating means for selectively directing light of said short wave length reflected from said reading station to said first sensing means and separately directing light of said long wave length to said second sensing means, and combining means responsive to the signals produced by said first and second sensing means for combining the sensing signals in selected time relation and polarity according to a preselected combining function to cancel sensing signals resulting from scanning of the non-fluorescent markings and produce a combined output signal representing only the sensing signals derived from scanning of the characters.

11. The combination cited in claim 10 wherein said separating means comprises a blue reflecting, red transmitting dichroic mirror interposed in the path of reflected and phosphor-emitted light from said reading station.

12. The combination recited in claim 5, wherein said differentially resposive separating means include a dichroic mirror interposed in the path of the light reflected from said reading station for separately directing the specular and diffuse reflected light along separate paths by transmitting one of the types of reflected light therethrough and reflecting the other of the types of reflected light.

13. The combination recited in claim 6, including means for polarizing the light from said first illuminating means along a first polarization axis, means for polarizing the light from said second illuminating means along a second and different polarization axis, color filter means for restricting the light from one of said illuminating means to a selected range of sensible specular frequencies, and said separating means including dichroic mirror and color filtration means for directing reflected light from one of said illuminating means to said first sensing means and directing the reflected light originating from the other of said illuminating means to said second sensing means.

14. The combination recited in claim 9, wherein said means for directing the light of selected frequency ranges to said first and second sensing means includes a dichroic mirror for transmitting therethrough light of the selected frequency range to said first sensing means and reflecting light lying outside of said selected frequency range to said second sensing means.

15. Scanning apparatus for scanning documents having intelligence bearing characters and interference markings thereon to produce output scanner signals freed of the interference, wherein the characters and markings are imprinted in mediums having selected optical properties by which the charatcers are distinguishable independently of shape from the markings, comprising a reading station through which the documents progress, illuminating means for illuminating the document portion at the reading station to produce reflection from the characters along a selected optical path containing a display of the selected optical properties for distinguishing the characters and markings, and to produce reflection from the markings containing a display of the selected optical properties of the markings along a selected optical path, scanning means interposed in said optical path to scan the light reflected along such optical paths in a selected pattern, first sensing means responsive to reflected light having the selected optical properties associated with the characters, second sensing means responsive to reflected light having the selected optical properties associated with the markings, each of said sensing means including means for producing a sensing signal indicative of the reflected light sensed by that sensing means, means for selectively directing light having the selected optical properties to which each of said sensing means is responsive to the associated sensing means, and combining means responsive to the signals produced by first and second sensing means for combining the sensing signals according to a selected combining function to cancel sensing signals resulting from scanning of the markings and produce an output scanner signal representing only the sensing signals derived from scanning of the characters.

References Cited in the file of this patent

UNITED STATES PATENTS

| | | |
|---|---|---|
| 2,388,727 | Dench | Nov. 13, 1945 |
| 2,461,254 | Bassett | Feb. 8, 1949 |
| 2,696,750 | Hunter | Dec. 14, 1954 |
| 2,786,400 | Peery | Mar. 26, 1957 |
| 2,797,256 | Millspaugh | June 25, 1957 |
| 2,936,886 | Harmon | May 17, 1960 |
| 2,988,984 | Eckert et al. | June 20, 1961 |

FOREIGN PATENTS

| | | |
|---|---|---|
| 493,221 | Belgium | May 2, 1950 |
| 810,409 | Great Britain | Mar. 18, 1959 |